(12) United States Patent
Lantz et al.

(10) Patent No.: US 6,839,651 B2
(45) Date of Patent: Jan. 4, 2005

(54) PROBE TIP THERMAL ISOLATION AND FAST PREDICTION ALGORITHM

(75) Inventors: Loren Lantz, St. Charles, MO (US); Robert B. Gaines, Lake Saint Louis, MO (US)

(73) Assignee: Sherwood Services AG (CH)

( * ) Notice: Subject to any disclaimer, the term of this patent is extended or adjusted under 35 U.S.C. 154(b) by 417 days.

(21) Appl. No.: 09/893,154

(22) Filed: Jun. 27, 2001

(65) Prior Publication Data

US 2003/0023398 A1 Jan. 30, 2003

(51) Int. Cl.[7] .............................. G01K 1/00; G01J 5/00
(52) U.S. Cl. ...................... 702/130; 702/131; 374/128; 374/194
(58) Field of Search ................................ 702/130, 131, 702/133, 134; 374/128, 129, 190, 194; 600/474, 549

(56) References Cited

U.S. PATENT DOCUMENTS

| | | | |
|---|---|---|---|
| 3,702,076 A | 11/1972 | Georgi | 73/362 |
| 4,054,057 A | 10/1977 | Kluge | 73/343 R |
| 4,159,766 A | 7/1979 | Kluge | 206/306 |
| 4,161,880 A | 7/1979 | Prosky | 73/342 |
| 4,183,248 A | 1/1980 | West | 73/362 |
| 4,411,535 A | 10/1983 | Schwarzschild | 374/165 |
| 4,464,067 A | 8/1984 | Hanaoka | 374/170 |
| 4,487,208 A | 12/1984 | Kamens | 128/736 |
| 4,531,842 A | 7/1985 | Schonberger | 374/1 |
| 4,536,851 A | 8/1985 | Germanton et al. | 364/557 |
| 4,572,365 A | 2/1986 | Bruno et al. | 206/306 |
| 4,574,359 A | 3/1986 | Ishizaka et al. | 364/557 |
| 4,592,000 A | 5/1986 | Ishizaka et al. | 364/557 |
| 4,602,871 A | 7/1986 | Hanaoka | 374/102 |
| 4,629,336 A | 12/1986 | Ishizaka | 374/169 |
| 4,642,785 A | 2/1987 | Packard et al. | 364/557 |
| 4,727,500 A | 2/1988 | Jackson et al. | 364/557 |
| 4,728,199 A | 3/1988 | Murai et al. | 371/170 |
| 4,729,672 A | 3/1988 | Takagi | 374/208 |
| 4,733,974 A | 3/1988 | Hagerman | 374/103 |
| 4,735,512 A | 4/1988 | Suzuki | 374/170 |
| 4,762,429 A | 8/1988 | Fujikawa | 374/163 |
| 4,771,791 A | 9/1988 | Kubouchi | 128/736 |
| 4,811,198 A | 3/1989 | Ota et al. | 374/169 |
| 4,843,577 A | 6/1989 | Muramoto | 364/557 |
| 4,866,621 A | 9/1989 | Ono | 364/413.03 |
| 4,878,184 A | 10/1989 | Okada et al. | 364/557 |
| D309,866 S | 8/1990 | Fukuda et al. | D10/57 |
| 4,986,669 A | 1/1991 | Yamaguchi | 374/107 |
| 5,011,294 A | 4/1991 | Yamaguchi | 374/107 |
| 5,013,161 A | 5/1991 | Zaragoza et al. | 374/208 |
| 5,066,141 A | 11/1991 | Ikeda et al. | 374/169 |

(List continued on next page.)

FOREIGN PATENT DOCUMENTS

| | | | |
|---|---|---|---|
| FR | 2580806 | 10/1986 | G01K/7/00 |
| GB | 2266771 | 11/1993 | G01K/1/18 |
| WO | WO 98/50766 | 12/1998 | G01K/1/18 |

*Primary Examiner*—John Barlow
*Assistant Examiner*—Meagan S Walling
(74) *Attorney, Agent, or Firm*—Mark S. Leonardo; Joseph P. Quinn; Brown Rudnick Berlack Israels LLP

(57) ABSTRACT

A prediction type electronic thermometer having an actively controlled heater element thermally isolating the probe tip from the probe shaft. Rapid and accurate temperature measurements are made using predictive algorithms. Control circuitry reads input from the temperature sensing element to compute best heater control signals so that the temperature of the probe shaft rapidly follows changes in the temperature of the probe tip. Thermal isolation between probe shaft and tip impedes heat flow from the heater element to the tip providing more accurate measurements. Rapid and accurate management of shaft temperature allows heat from the patient being measured to be most efficiently transmitted to the temperature sensor element resulting in very fast temperature measurements.

26 Claims, 9 Drawing Sheets

U.S. PATENT DOCUMENTS

| | | |
|---|---|---|
| 5,116,136 A | 5/1992 | Newman et al. ............ 374/102 |
| 5,133,606 A | 7/1992 | Zaragoza et al. ........... 374/208 |
| 5,165,798 A | 11/1992 | Watanabe ................... 374/208 |
| 5,259,389 A | 11/1993 | Muramoto et al. ......... 128/736 |
| 5,388,134 A | 2/1995 | Douglass et al. ............. 377/25 |
| 5,392,031 A | 2/1995 | Toriumi et al. ............. 340/588 |
| 5,473,629 A | 12/1995 | Muramoto .................. 374/102 |
| 5,513,235 A | 4/1996 | Douglass et al. ............. 377/25 |
| 5,632,555 A | 5/1997 | Gregory et al. ............. 374/102 |
| 5,725,308 A | 3/1998 | Smith et al. ................ 374/169 |
| 5,738,441 A | 4/1998 | Cambridge et al. ......... 374/102 |
| D395,609 S | 6/1998 | Knieriem et al. ............ D10/57 |
| 5,820,263 A | 10/1998 | Ciobanu ..................... 374/111 |
| 6,000,846 A * | 12/1999 | Gregory et al. ............. 374/164 |
| 6,129,673 A * | 10/2000 | Fraden ....................... 600/474 |

\* cited by examiner

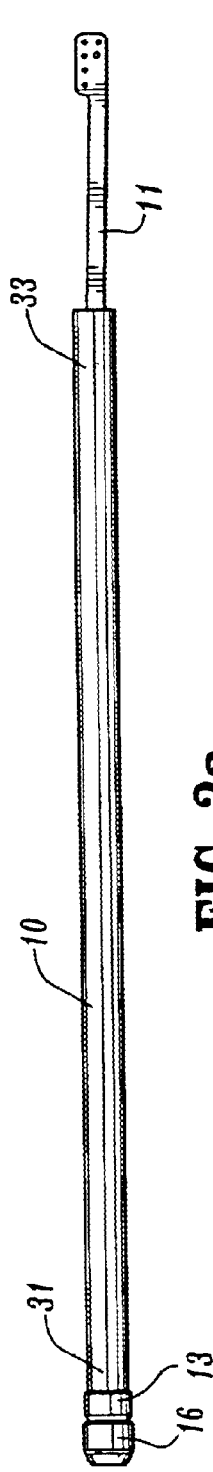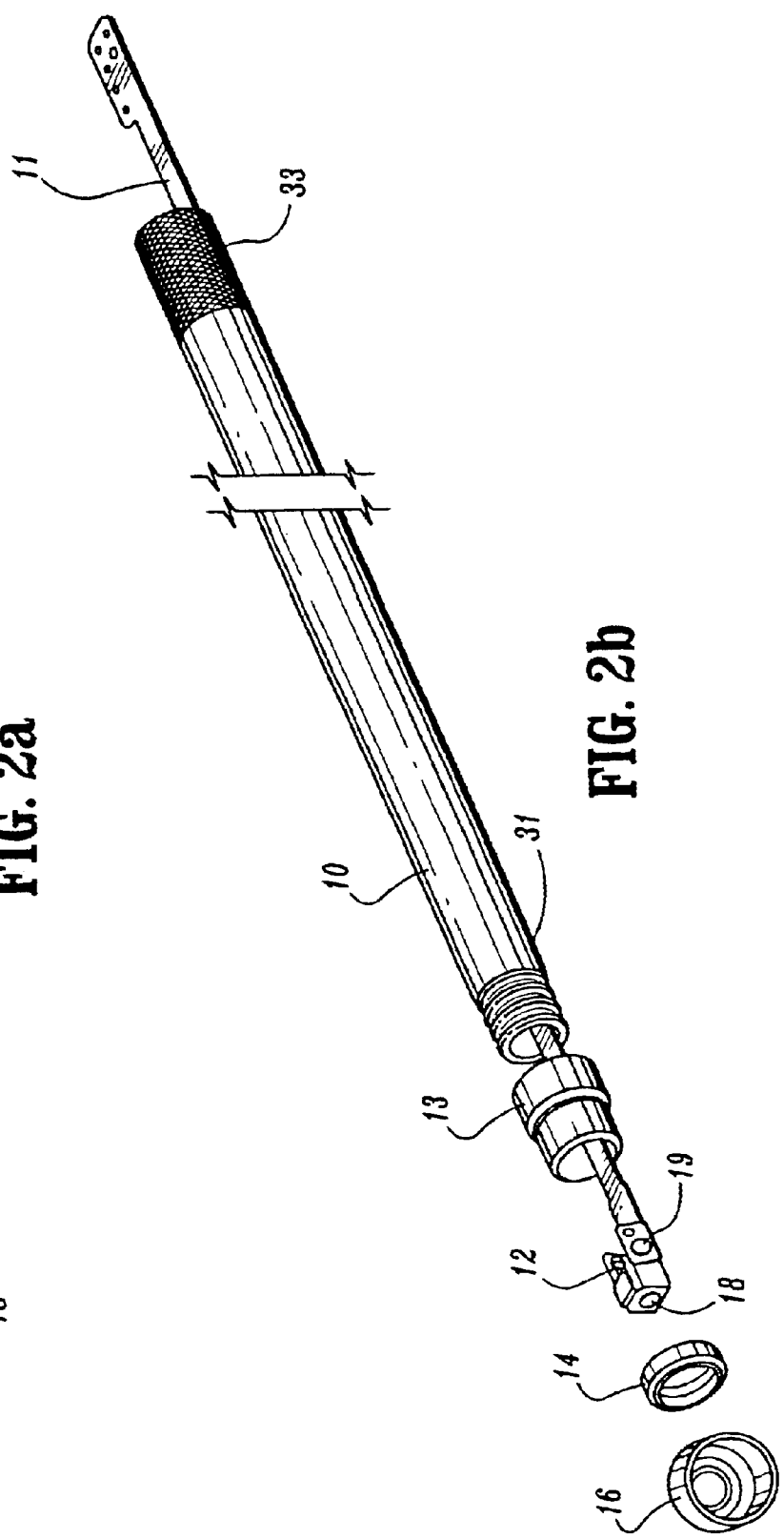
FIG. 2a
FIG. 2b

PROBE TIP THERMAL ISOLATION AND FAST PREDICTION ALGORITHM

FIELD OF THE INVENTION

The invention pertains to the field of electronic thermometers and more particularly the field of fast response electronic thermometers employing a sensor probe.

BACKGROUND OF THE INVENTION

Electronic thermometers are widely used in the healthcare field for measuring patient's body temperature. Typical electronic thermometers have the form of a probe with an elongated shaft portion. Electronic temperature sensors such as thermistors or other temperature sensitive elements are contained within the shaft portion. Additional electronics connected to the electronic sensor components may be contained within a base unit connected by wire to the shaft portion or may be contained within a handle of the shaft portion, for example. Electronic components receive input from the sensor components to compute the patient's temperature. The temperature is then typically displayed on a visual output device such as a seven segment numerical display device. Additional features of known electronic thermometers include audible temperature level notification such as a beep or tone alert signal. A disposable cover or sheath is typically fitted over the shaft portion and disposed after each use of the thermometer for sanitary reasons.

Electronic thermometers have many advantages over conventional thermometers and have widely replaced the use of conventional glass thermometers in the healthcare field. For example, electronic thermometers do not require costly sterilization procedures and do not present danger of broken glass causing injury to a patient. Furthermore, electronic thermometers generally have a faster response time than glass thermometers and provide more precise and accurate temperature measurement information.

Despite the response time improvements over glass thermometers, typical electronic thermometers still have unacceptably long response time. The long response time is primarily due to the thermal mass of the probe together with the sensor components. The thermal mass of the probe and the sensor components may take several minutes to reach the actual body temperature of the patient being measured. The thermal mass of the probe typically begins a measurement cycle at a lower temperature than the patient being measured and absorbs heat from the patient until the patient and the thermal mass of the probe reach thermal equilibrium. Therefore, the thermal mass of the probe prevents the sensor temperature from instantaneously reaching a patients body temperature.

Electronic thermometers in the prior art are known having improved response times that are achieved using a number of different techniques. One technique known in the art employs thermally conductive material such as metal in the probe tip between the patient contact area and the temperature sensor. Another technique uses a very thin layer of material between the patient contact area and the temperature sensors. Both of these techniques improve response time somewhat but still allow time to be wasted while heat from the patient flows to the thermal mass of the probe instead of the temperature sensors.

Previously known electronic thermometers have employed electric heater elements in the probe shaft to bring the temperature of the thermal mass of the probe shaft and probe tip closer to the temperature of the patient prior to taking temperature measurements. Temperature sensor readings are used in known methods to control electric current to the heater element. Time is saved because less heat must be transferred from the patient to the thermal mass of the probe before the temperature sensors reach thermal equilibrium with the patient.

The response time of electronic thermometers has also been improved by methods that do not involve heating the probe shaft or tip. Predictive type thermometers are known for example, wherein a set of early temperature measurements are read by the electronics of the thermometer and a mathematical algorithm is applied to extrapolate to a final estimated equilibrium temperature. Various prediction type thermometers are known which improve response time and provide accurate temperature estimations. Still other methods of improving the response time of electronic thermometers are known which combine heating methods with prediction methods.

Even though thermometers have been improved by various methods in the prior art, disadvantages of the prior art thermometer leave room for improvement. For example, the prior art thermometers still suffer from excessively long response times. Furthermore, prior art thermometers which use heated probe tips to improve response time still suffer from inaccurate readings caused by the heated probe tips.

SUMMARY OF THE INVENTION

The present invention is embodied in a prediction type electronic thermometer configured to thermally decouple the thermometer probe tip from the thermometer shaft. Advantages included in the present invention provide active feedback control to a heater element in the thermometer shaft which heats the shaft in response to signals from temperature sensors according to a time optimized algorithm. According to the present invention, a thermal isolator isolates or thermally decouples the shaft from the tip. Heat from the patient flows to the tip and remains there raising the tip temperature more quickly than raising the tip and thermally coupled shaft. Equilibrium between the temperature sensor and the patient is thereby reached more quickly. A close fitting probe cover having nominal resistance thermally isolates the tip from the patient when the probe is placed into a patient cavity. Thermal energy flows from the patient tissue through the cover and into the tip.

A heater control component uses an active feedback control algorithm according to the present invention to track the probe tip temperature as indicated by the signal from the temperature sensors. The heater control component increases current flow to the heater in increments that are calculated to minimize the time required for the patient thermal energy to raise the tip temperature.

The active feedback control of the heater element provides substantial advantages over the thermometers in the prior art. For example, U.S. Pat. No. 5,632,555 to Gregory et al. uses a hollow probe tip having a low heat capacity that incorporates a resistive heater element to heat the probe tip when the probe is removed from a base housing. The heater element of the Gregory et al. raises the temperature of the thermal mass of the probe to about 93° F. without active control. Such uncontrolled shaft heating may heat the probe shaft too slowly or too quickly and may cause slow or inaccurate temperature readings.

The present specification also discloses improvements over known fast response thermometers such as the thermometer disclosed in U.S. Pat. No. 4,183,248 to West. The West thermometer includes a heat servo which thermally isolates the probe tip from the remainder of the probe and reduces the long thermal time constants which would otherwise be associated with flow of heat from the tip area down the probe shaft. The time response of the system is then limited only by the tip area of the probe. The tip area is made of high heat conductivity material that is placed in intimate thermal contact with the body whose temperature is to be measured. In the thermometer disclosed by West, electric current through the heater element is controlled by an analog amplifier circuit which responds to the temperature sensed by a pair of measuring sensors located separately on the probe tip. The sensors are arranged so that one is on the most distal end of the probe tip and one is in contact with a side of the probe tip more proximate to the probe shaft. The difference between temperatures sensed by each sensor is indicative of heat flow from the tip to the shaft whereby larger temperature differentials indicate more heat should be applied to the heater to raise the temperature of the tip. An analog feedback circuit is used to control the heater elements based on the differential between the two sensor elements.

The thermometer disclosed by West introduces inaccuracies to temperature measurements due to the heat that is transferred to the tip sensor elements from the heater element rather than from the patient being measured. A thermal isolator that is used in embodiments of the present invention reduces many of these inaccuracies. Further inaccuracies and inefficiencies in the West thermometer are caused by the analog feedback method of heater control which is not mathematically optimized to the most time efficient method of adding heat to the probe tip. Embodiments of the present invention overcome these inaccuracies by using digital feedback to implement an optimized feedback algorithm. Still further disadvantages of the analog feedback circuitry of the West device include the required careful tuning of resistor elements in the feedback circuit and inaccuracies introduced by the manufacturing differences between the resistive elements and the feedback circuit. Embodiments of the present invention do not require such tuning of components. The West device also disadvantageously waits until thermal equilibrium in the tip is reached which may take approximately 26 seconds. The present invention provides a significant decrease in response time by more rapidly predicting an equilibrium temperature according to early sensor measurements.

The present invention also uses an active prediction algorithm that monitors the tip temperature in time and uses that information to predict the final stabilization temperature and provides significant advantages over prediction type thermometers in the prior art. For example, the thermometer disclosed in U.S. Pat. No. 5,632,555 to Gregory et al. includes electronics which perform early temperature predictions based on measurements made long before the probe tip reaches thermal equilibrium with the probe shaft. The Gregory et al. patent also discloses a heating element in the tip which raises the temperature of the probe tip to about 93° F. As with the West thermometer, the Gregory thermometer introduces inaccuracies to the temperature measurement by applying heat to the probe tip as well as the probe shaft. The Gregory thermometer disadvantageously does not control the amount of heat applied to the shaft in response to the temperature of the tip. Rather, the Gregory thermometer attempts to regulate the probe's tip temperature at the 93° Fahrenheit level. Such temperature control may improve the response time with respect to a non-heated temperature probe but is not optimized for the fastest temperature response time. Embodiments of the present invention provide more improved response time, for example, by employing an optimized heater control method.

The present invention features a probe tip that is thermally decoupled from the probe shaft thereby substantially reducing response time of the temperature sensing element in the probe tip. Thermal energy from the heater element does not flow readily into the probe tip so the temperature sensing element in the probe tip can provide a more accurate representation of the patient temperature.

Embodiments of the present invention uses a prediction algorithm providing a very accurate prediction of patient temperature in minimum time. The prediction algorithm of the invention was selected from a number of temperature prediction algorithms as providing the fastest and most accurate response time for the particular thermal configuration embodied in the probe shaft and tip of the invention. The present invention also features a prediction algorithm that is faster and more accurate than prediction type electronic type thermometers known in the art. The prediction algorithm may be started several different times, each separated by a distinct amount of time, so that each of the several predictions are running with different starting points of the data stream. The several predictions may be continuously updated as additional data is sampled. Metrics based on physiological factors are used to select the best of the several running prediction algorithms.

Further features of the present invention include a heater control circuit which does not require tuning of a plurality of resisters or other electronic components and does not suffer from inaccuracies attributable to manufacturing tolerance differences in said plurality of electronic components such as resisters and capacitors and further does not suffer from the inaccuracies introduced by heating the probe tip.

Embodiments of the present invention also feature the use of calibration values that are read to compensate for thermistor variation instead of compensating for thermistor variation with added resistors. Labor intensive calibration steps are eliminated during manufacturing by eliminating the need for adding compensating resistors Further features of the embodiments of the present invention include a flex circuit that is used to maintain the geometric placement of components. The flex circuit reduces manufacturing costs for placement and connections of the temperature sensors and heater elements and their connections to the control and prediction circuitry.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 2A is a view of the various components of a temperature probe according to at least one embodiment of the invention;

FIG. 2B is an exploded view of the various components of a temperature probe according to at least one embodiment of the invention;

DETAILED DESCRIPTION OF THE INVENTION

Figure 1A:
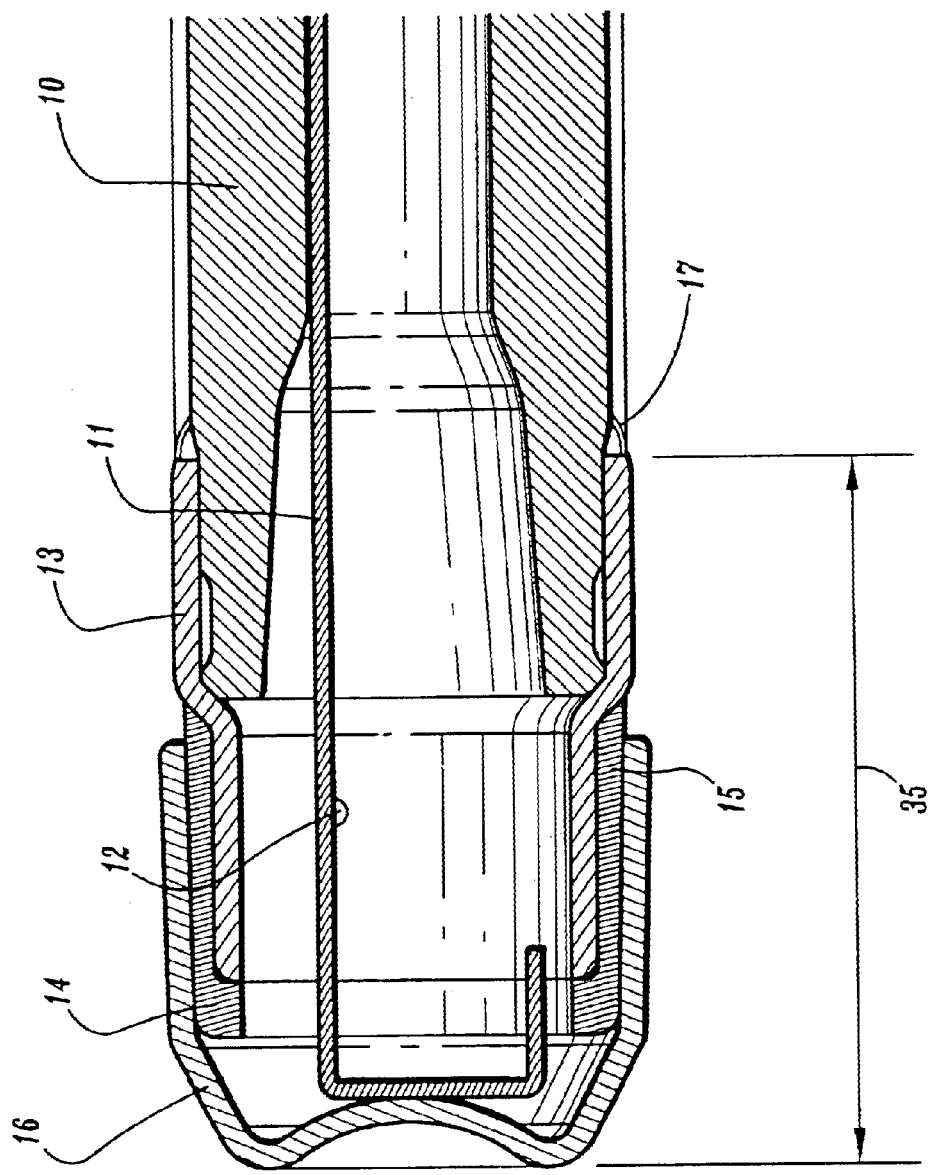
FIG. 1A is a cross sectional view of a thermometer probe according to at least one embodiment of the invention.
Figure 1B:
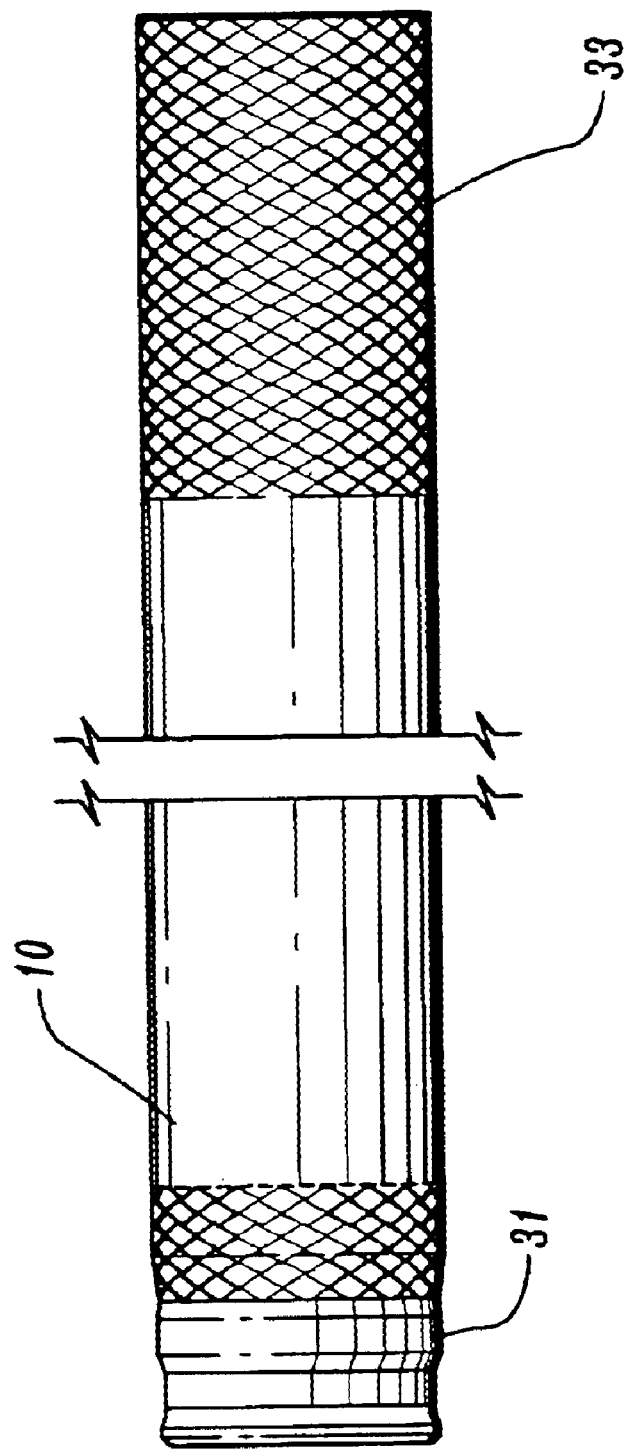
FIG. 1B is a view of a probe shaft component according to at least one embodiment of the invention.
Figure 1C:
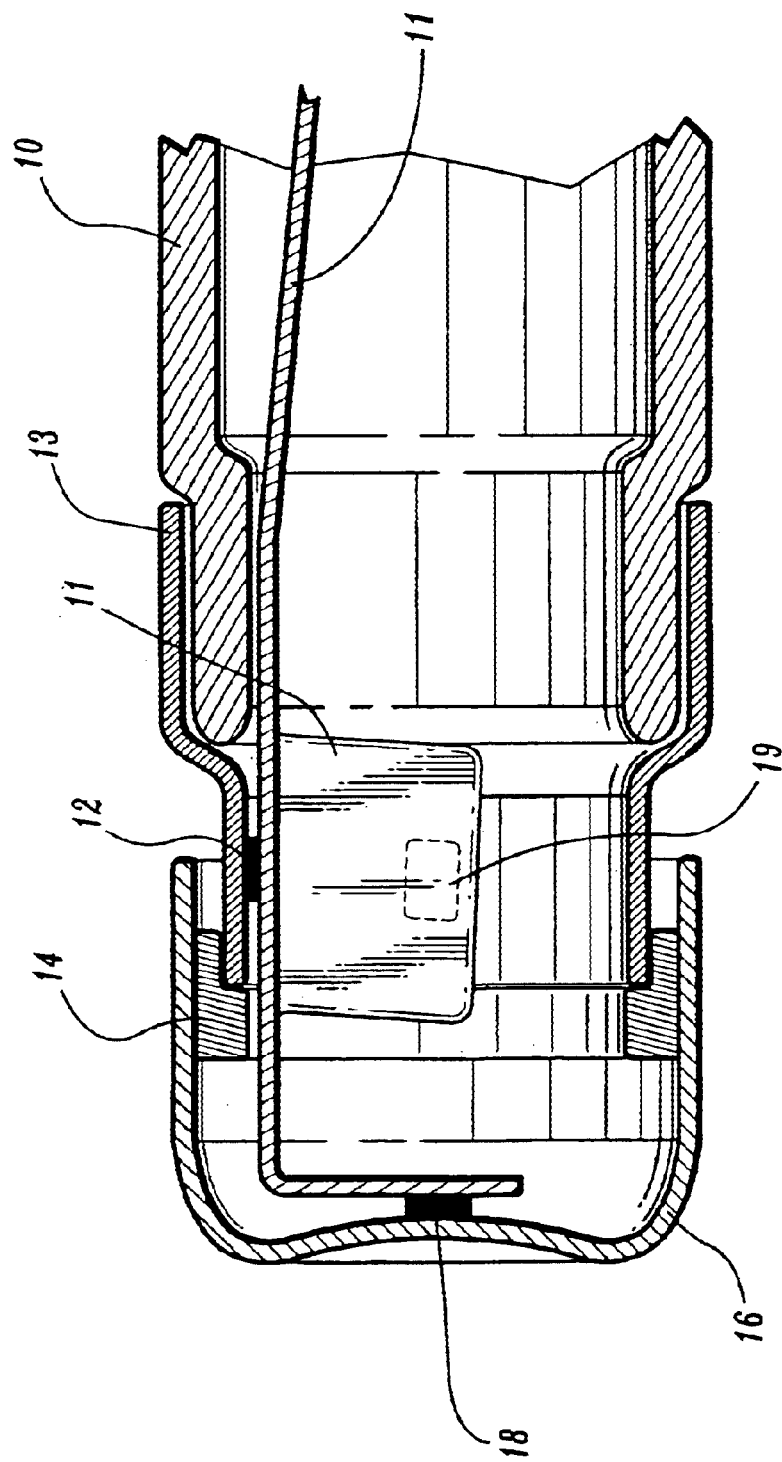
FIG. 1C is a cross sectional view of a thermometer probe according to at least one embodiment of the invention.

With reference now to the drawings and particularly to FIGS. 1A, 1B, 1C, 2A and 2B, an electronic thermometer is shown configured according to at least one embodiment of the present invention. A probe shaft 10 is shown having a distal end 31 and a proximate end 33 and having a separator 13 disposed on its distal end. In an exemplary embodiment the probe shaft 10 is made from CELCON M90 available from Adam Spence Corporation. Celcon is an acetal that was selected for toughness and notch resistance. Celcon has the additional advantage for the probe shaft material because it can also be extruded. The separator 13 is made from 3033-H14 aluminum. The aluminum material was selected for the separator because aluminum is best suited for the separator fabrication stamping operation. A heater element 12 is in contact with the separator 13 and provides heat thereto. In an exemplary embodiment, the heater element is a 100 ohm, ⅙ watt 1% 0603 SMD resistor. Many resistor configurations will work such as two 200 ohm 0402 SMD resistors in parallel. A five percent tolerance is also acceptable. The separator 13 is mounted around the exterior surface of the probe shaft 10 and fits tightly thereto so that heat is sufficiently transferred from the separator 13 to the probe shaft 10. Power conductors (not shown) supply power to the heater element and are connected between the heater element and the heater control circuit (not shown). A thermal isolator 14 is disposed around the separator 13 and between the separator 13 and probe tip 16. In an exemplary embodiment, the thermal isolator 14 is made from HDPE-DOW 25455N available from Dow Corporation. Many other HDPEs will work. For example, Solvay Fortiflex HDPE or EXXON Escorene HD 6801YN materials may be used for the thermal isolator. These materials were chosen for higher than normal thermal conductivity and biocompatibility requirements. The probe tip is made from 3003-H14 aluminum.

The thermal isolator 14 substantially impedes heat flow from the separator 13 to the probe tip 16. Accordingly, most of the heat generated in the heater element 12 flows to the separator 13 and is used to heat the probe shaft 10. The probe tip 16 is disposed around the thermal isolator 14 without coming in contact with either heater element 12, the separator 13 or the probe shaft 10. The probe tip 16 is thereby thermally isolated from the probe shaft 10. A tip temperature sensor 18 such as a thermistor is disposed against an interior wall of the probe tip. A proximal temperature sensor 19 such as a thermistor is disposed against an interior surface of the thermal separator 13. Temperature signal conductors (not shown) are connected from the tip temperature sensor 18, the proximal temperature sensor 19, and the heater control circuit. Temperature signal conductors (not shown) are also connected to a temperature prediction component (not shown). In at least one embodiment, the temperature signal conductors are connected to a microprocessor system which performs the functions of both a heater control circuit and a temperature prediction component. The proximal temperature sensor 19 provides a signal indicative of the separator temperature to the heater control circuit for use in computing a heater current control value. The proximal temperature sensor 19 may also provide a signal indicative of the separator temperature to the temperature prediction component for use in a temperature prediction algorithm.

Various embodiments of the invention are used with a close fitting probe cover which isolates the probe tip 16 from the patient. Such a probe cover has nominal resistance and capacitance. When the probe is placed into a patient cavity, thermal energy flows from the patient tissue through the cover and into the probe tip 16. Patient energy heats the tip and does not flow into the heated shaft so the probe tip reaches thermal equilibrium with the patient more quickly.

Assembly of an illustrative embodiment of the invention is described with particular reference to FIGS. 1A, 1B, 1C, 2A and 2B. The probe shaft 10 is described as having a distal (tip) end 31 and a proximate end 33. Prior to assembly of the separator 13 to the distal end 31 of the probe shaft 10, the outside circumference of the distal end 31 is roughened, for example by holding 320 grit sandpaper against the outside surface while rotating the shaft. A sealant such as UL Listed Emerson Cummings 2850 Epoxy is then applied to the roughened area of the shaft 10 and the separator 13 is assembled to the shaft 10.

Figure 3A:
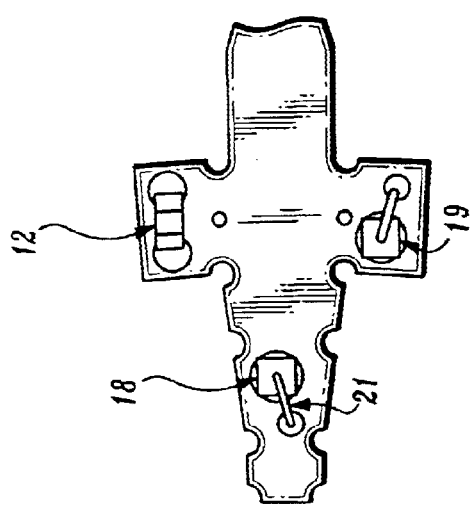
FIG. 3A is an enlarged view of a tip end of a flexible circuit component used in at least one embodiment of the invention.
Figure 3B:
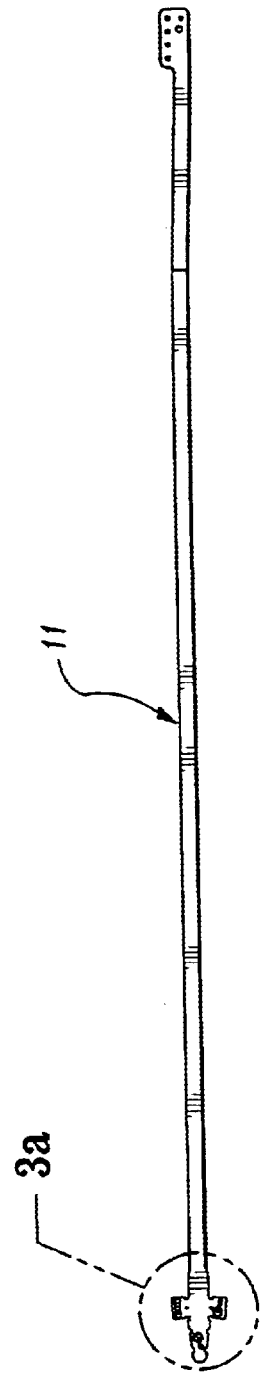
FIG. 3B is an illustration of a flexible circuit component having a tip end shown in FIG. 3A used in at least one embodiment of the invention.

In the illustrative embodiment, a flex circuit 11 as illustrated in FIGS. 3A and 3B may be used to efficiently provide signal conductors and heater power conductor to the temperature sensors 18, 19 and heater element 12, and to provide proper positioning of the temperature sensors 18, 19 and heater element 12 within the assembly. The flex circuit 11 may be formed, for example by folding with a properly configured assembly tool. A folded flex circuit 11 can be seen with reference to FIG. 2B. The flex circuit 11 is secured by adhesive to the inside diameter of the shaft 10 to stabilize the flex circuit 11 during assembly.

A thermal adhesive (epoxy) is applied between to the proximal temperature sensor (thermistor) 19 and the inside diameter of the thermal isolator 14 and between the heater element (resistor) 12 and the inside diameter of the thermal isolator 14. The thermal isolator 14 is assembled over the separator 13. Thermal adhesive (epoxy) is also applied between the tip sensor (thermistor) 18 and the inside center portion of the probe tip 16. The probe tip 16 is assembled over the thermal isolator 14 and pressed using a properly configured assembly tool to establish a correct tip—separator length 35. In an exemplary embodiment of the invention the tip-separator length 35 is 0.266 inches. A properly configured crimping tool is used to crimp the proximal end of the separator 13 to the shaft 10.

It will be recognized with reference to FIG. 1A that the thermal isolator 14 establishes a gap between the inside diameter of the probe tip 16 and the outside diameter of the separator 13. In the illustrative embodiment, this gap is filled with adhesive/sealant such as thermal epoxy to seal the joint and provide a thermally conductive path between the two components. The shaft 10 is then filled with a thermally conductive UL Listed Emerson Cummings 2850 Epoxy to seal the shaft assembly and stabilize the flex circuit 11.

Figure 4:
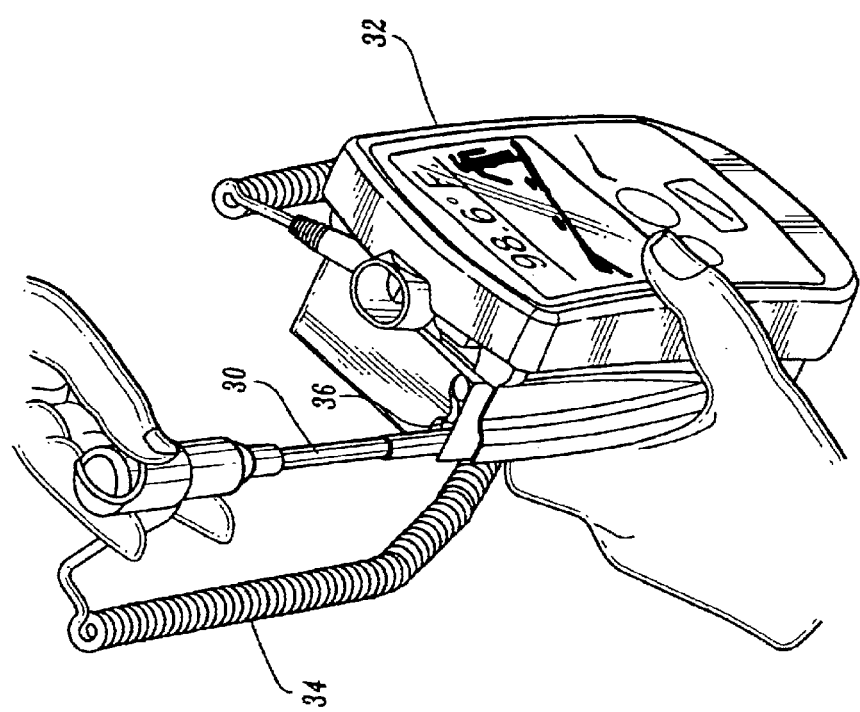
FIG. 4 is an illustration of an electronic thermometer having a base unit according to at least one embodiment of the invention.

Referring now to FIG. 4, in at least one embodiment of the present invention, the base unit 32 houses a power supply and electronics for the heater control circuit and the temperature prediction component. A flexible cable 34 carries power from the base unit 32 to a probe 30 which includes the probe shaft 10 and probe tip 16. The power conductors to the heater element 12 and the temperature signal conductors from the temperature sensors 18, 19 are included in the flexible cable 34. While not in use, the probe 30 may be stored within a slot 36, for example, in the base unit 32. In at least one embodiment of the invention, the slot 36 may include a switch to trigger initiation of the heater control circuit so that the heater element 12 may be powered up beginning when the probe 30 is removed from slot 36. In an alternative embodiment, the heater control circuit may be initiated in response to sensed temperature changes at the temperature sensors 18, 19.

Figure 5:
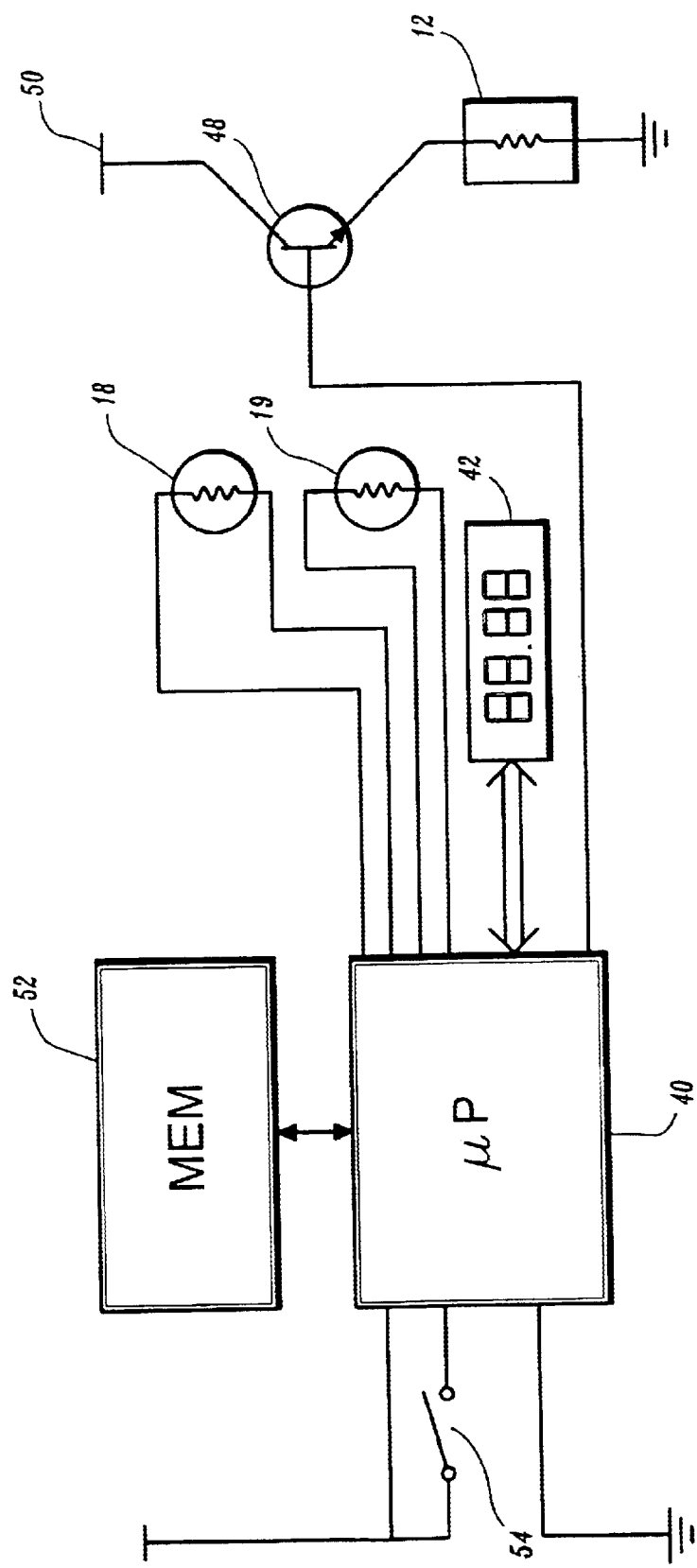
FIG. 5 is a schematic diagram of measurement and control circuitry used in at least one embodiment of the present invention.

Referring now to FIG. 5, an exemplary control circuit is illustrated which includes both a heater control circuit and a temperature prediction component. The control circuit includes a microprocessor 40 and memory 52. The memory 52 may be separate or within the microprocessor 40. Programmed instruction steps stored in memory or within the microprocessor 40 sense an input signal from trigger switch 54. The program instructions then cause the microprocessor 40 to send a signal to the power control device 48 such as a transistor allowing current to flow from a power supply 50 to heater element 12. The program instructions further cause the microprocessor 40 to continuously monitor input from temperature sensors (thermistors) 18, 19 and to adjust signals to the heater control component 48 in response thereto according to a predetermined heater control algorithm. Input from the temperature sensors 18, 19 to the microprocessor 40 is also used by a temperature prediction algorithm which causes the microprocessor 40 to output a predictive temperature indication signal to an output display 42. In at least one embodiment, interim output display signals are continuously updated as the temperature sensors 18, 19 reaches equilibrium. In an alternative embodiment, no output is displayed until after the temperature sensors 18, 19 reaches equilibrium. In still another alternative embodiment, the microprocessor may cause an audible indicator signal to be energized when an output prediction has been determined to be accurate according to the output temperature prediction algorithm.

The temperature prediction algorithm monitors the probe tip 16 temperature in time and then uses that information to predict the final stabilization temperature. The prediction algorithm uses the following equation derivations to make accurate temperature predictions based on heater temperature, probe tip temperature, cover temperature, skin temperature, body temperature, tissue capacitance, cover capacitance, probe tip capacitance, body skin resistance, skin-cover resistance, cover-probe resistance, probe-heater resistance, and time.

$$\dot{T}_p = \frac{T_c - T_p}{R_3 C_3} + \frac{T_h - T_p}{R_4 C_3} \quad \text{(equation 1)}$$

$$\dot{T}_c = \frac{T_s - T_c}{R_2 C_2} + \frac{T_p - T_c}{R_3 C_2} \quad \text{(equation 2)}$$

$$\dot{T}_s = \frac{T_b - T_s}{R_1 C_1} + \frac{T_c - T_s}{R_2 C_1} \quad \text{(equation 3)}$$

-continued $$T_b = T_p + (T_p - T_h)\frac{R_1 + R_2 + R_3}{R_4} + \quad \text{(equation 4)}$$
$$\dot{T}_p(R_1 C_1 + R_2 C_3 + R_3 C_3 +$$
$$R_2 C_2 + R_1 C_3 + R_1 C_2) +$$
$$(\dot{T}_p - \dot{T}_h)\left(R_1 C_1 \frac{R_3 + R_2}{R_4} + (R_1 R_2 + R_2 C_2)\frac{R_3}{R_4}\right) +$$
$$\ddot{T}_p(R_1 C_1 R_2 C_3 + R_3 C_3 R_1 C_1 + R_1 C_1 R_2 C_2 +$$
$$R_2 C_2 R_3 C_3 + R_1 C_2 R_3 C_3) +$$
$$(\ddot{T}_p - \ddot{T}_h)R_2 C_2 R_1 C_1 \frac{R_3}{R_4} + \dddot{T}_p R_1 C_1 R_2 C_2 R_3 C_3$$

if $$T_h = T_p + kC_3 R_4 \dot{T}_p \rightarrow T_p = T_c \text{ if } k = 1 \quad \text{(equation 5)}$$

$$T_b = T_p(R_1 C_1 + R_2 C_2 + R_1 C_2 + (1-k)(R_3 C_3 + \quad \text{(equation 6)}$$
$$R_2 C_2 + R_1 C_3)) + \ddot{T}_p(R_1 C_1 R_2 C_2 +$$
$$(1-k)(R_1 C_1 R_2 C_3 + R_3 C_3 R_1 C_1 +$$
$$R_2 C_2 R_3 C_3 + R_1 C_2 R_3 C_3)) +$$
$$\dddot{T}_p R_1 C_1 R_2 C_2 R_3 C_3 (1-k)$$

wherein:
 $T_h$=Heater Temperature
 $T_p$=Probe Tip Temperature
 $T_c$=Cover Temperature
 $T_s$=Skin Temperature
 $T_b$=Body Temperature
 $C_1$=Tissue Capacitance
 $C_2$=Cover Capacitance
 $C_3$=Probe Tip Capacitance
 $R_1$=Body-Skin Resistance
 $R_2$=Skin-Cover Resistance
 $R_3$=Cover-Probe Resistance
 $R_4$=Probe-Heater Resistance
 t=time In the design for this embodiment, the value of k is empirically determined to optimize the performance of the prediction algorithm. A proportional plus derivative feedback control algorithm is employed. A Smith predictor may also be used to correct for phase delay. The prediction algorithm development follows below.

Equation 6 implies a second order differential system. Its parameters can be estimated using first and second order derivative estimates. In real-world systems, such estimates (especially second partials) are prone to be very noisy. An alternative approach is to select from a candidate set of approximating functions, one that approximates the temporal temperature rise.

The function that works well is:

$$T_p(t) - T_p(0) = \frac{t - t_0}{a \cdot (t - t_0) + b} \quad \text{(equation 7)}$$

simplifying to linear form $$\frac{t - t_0}{T_p - T_p(0)} = a \cdot (t - t_0) + b \quad \text{(equation 8)}$$

$$T_{final} = \frac{1}{a} + T_p(0) \quad \text{(equation 9)}$$

Discrimination functions are defined to pick an appropriate initial time and temperature to start collecting data.

Well-known linear-regression methods were used to estimate the slope term, 'a'. Additional discrimination functions were added to guarantee compliance with heuristic goodness criteria when estimating the unknown slope term 'a'.

In an illustrative embodiment, the probe tip is heated to an initial value of ~95 degree F. that was determined empirically during development. It is understood that various embodiments of the present invention may be heated to different initial temperatures within a range for example of between about 92 degrees F. to about 95.9 degrees F. The user-interface display then indicates that the unit is ready. The probe is inserted into the patient cavity. After an appropriate time, for example 4 to 11 seconds depending on many physiological variables, a final prediction is presented. Various embodiments of the present invention allow different periods of time to pass before presenting a final prediction. For example, the appropriate prediction time may range from 3.2 seconds to about 30 seconds. Interim results are shown throughout the interval. In the illustrative embodiment, the unit beeps and the display freezes when the prediction goodness criteria are satisfied.

Use of an exemplary embodiment of an electronic prediction thermometer according to at least one embodiment of the present invention will now be described with reference to FIGS. 6 and 7. The temperature measurement is initiated 60 by removing a temperature probe from a slot 36 in the base unit 32. A microprocessor control circuit, which had been running in standby mode, signals 62 the heater control component to preheat the probe tip 42. The microprocessor control circuit then reads 62 the tip temperature sensor 18 and compares 66 the measured temperature to a preselected level of about 35° C. If the tip temperature sensor 18 indicates a temperature of less than the preselected level then the steps of applying power to the heater element 62 and reading the tip temperature sensor 64 are repeated. While the probe is preheating a user slides a sanitary sheath over the probe shaft. The preheat step continues until the tip temperature sensor stabilizes at 34.25 to 35.25 C. If the tip temperature sensor 18 indicates a temperature at or above the preselected level then a ready signal is actuated 68. The ready signal in the exemplary embodiment is an audible beep signal that alerts the user that the thermometer is ready to take a measurement. The microprocessor control circuit then monitors 70 the tip temperature sensor 18, looking for a rise in temperature to indicate that the thermometer has been placed in the patient cavity. In various embodiments, either the tip temperature sensor or the proximal temperature sensor or both can be used to monitor the probe temperature during the preheating phase to determine when the thermometer has been placed in a patient cavity.

Figure 6:
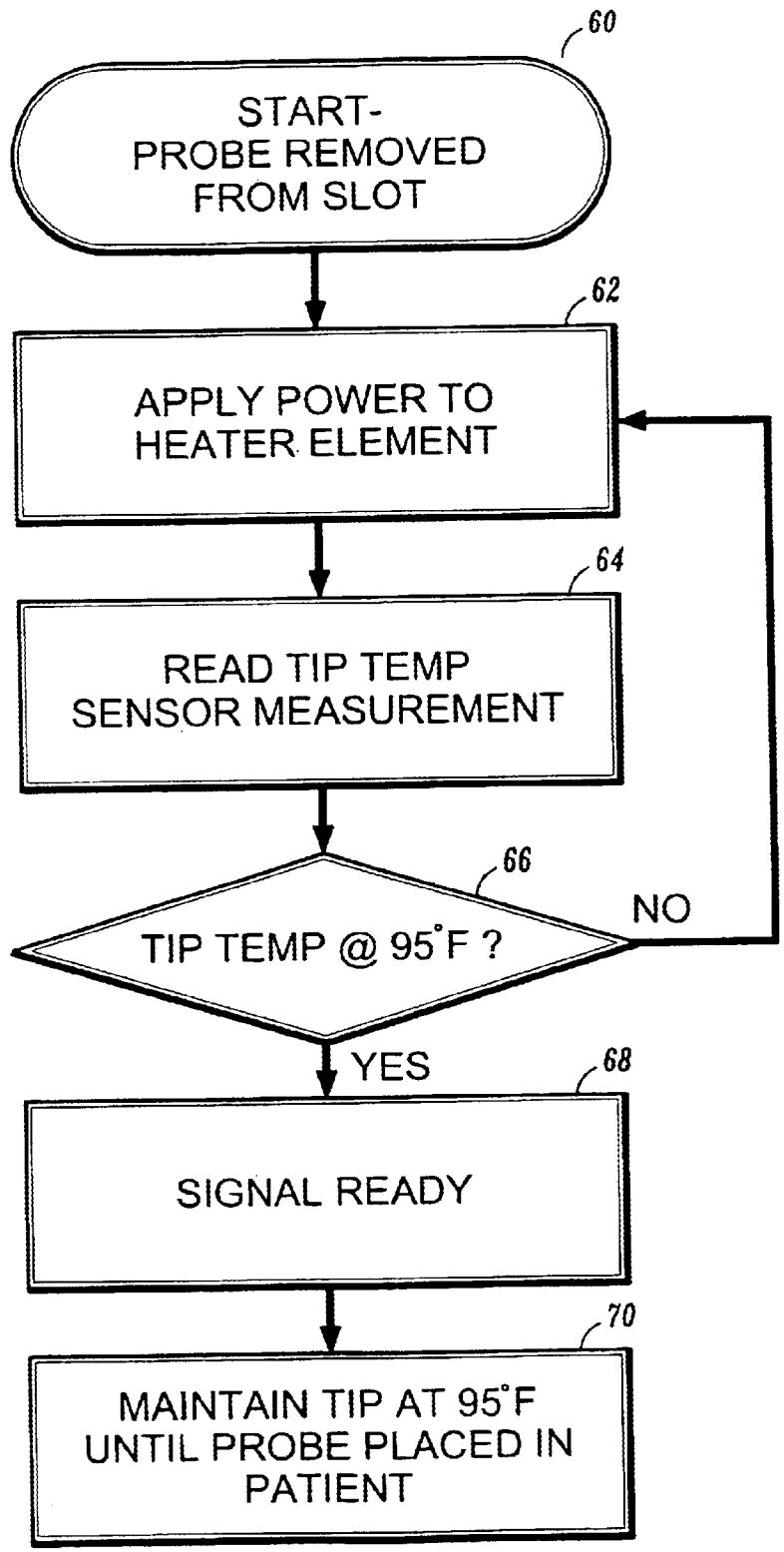
FIG. 6 is a functional block diagram of a pre-heated phase of operation according to at least one embodiment of the present invention.
Figure 7:
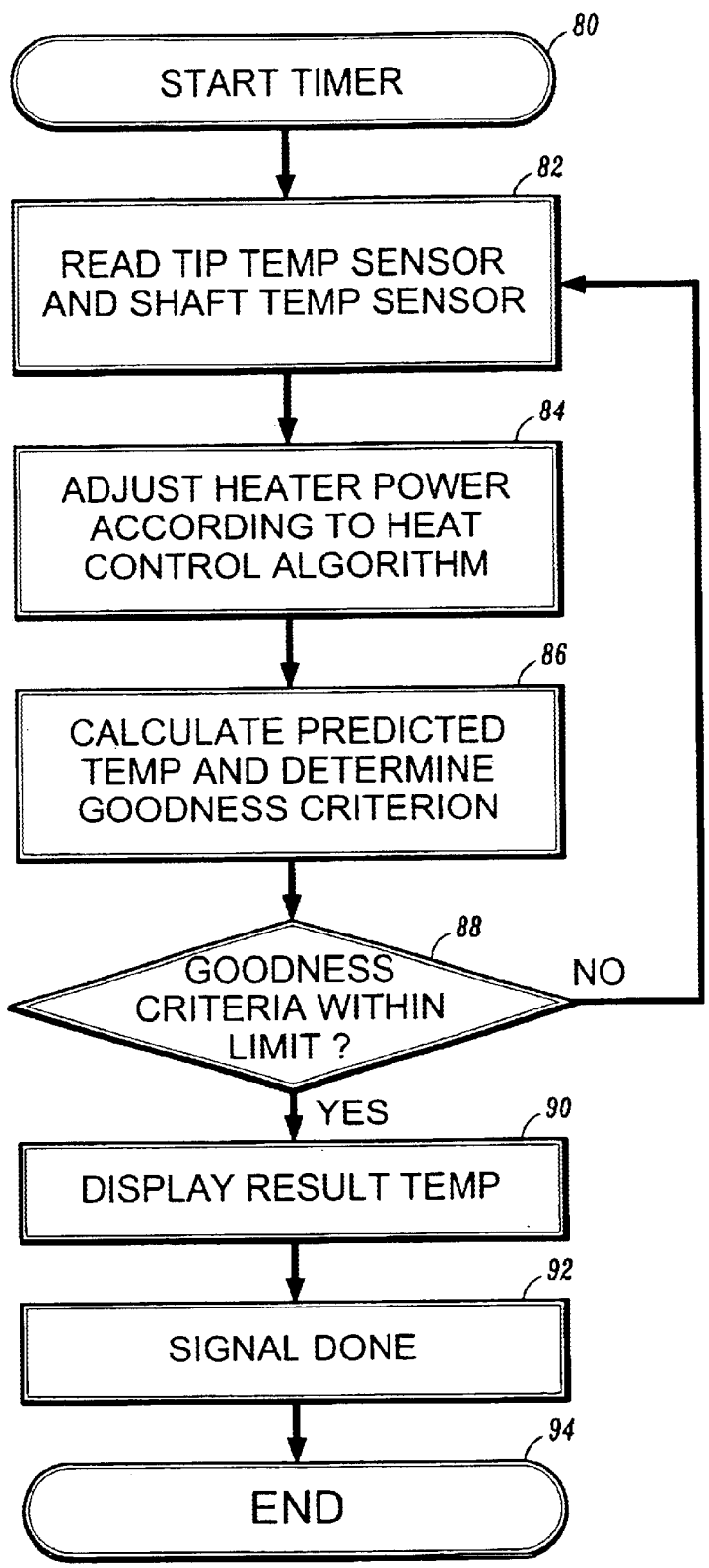
FIG. 7 is a functional block diagram of a measurement phase of operation according to at least one embodiment of the present invention.

In the exemplary embodiment illustrated in FIGS. 6 and 7, the microprocessor control circuit starts a timer 80 and turns on an active feedback control which regulates the amount of heat going to the heater element. The active feedback control optimally causes the temperature of the probe shaft to track the reported or sensed temperature of the tip from the temperature sensor element. Such optimal temperature tracking allows an accurate prediction to be made within a very short time, typically from 4–11 seconds, depending on many physiological variables. In the exemplary embodiment, the microprocessor control circuit reads 82 signals from the tip temperature sensor 18 and the proximal temperature sensor 19 for use in both a heater control algorithm and a temperature prediction algorithm. Power to the heater is actively adjusted 84 according to the heater control algorithm.

The following heater control algorithm is an exemplary embodiment of an optimized heater control algorithm according to the present invention:

Errorlast=Errornow;

Errornow=SP−Tptemp;

DutyCycle=(int)(Apreheat*Errornow+Bpreheat*(Errornow−Errorlast)+0.5);

wherein:

Errorlast is a variable for storing the previously determined Errornow value;

Errornow is a variable storing the difference between the point temperature and a measured probe tip temperature;

DutyCycle is a variable representing percentage of time to apply heater current;

SP=35 C;

Tptemp=probe tip temperature sensor data in degrees C; and

Apreheat and Bpreheat=constants that depend on power supply voltage level.

Final temperature predictions are calculated 86 according to the temperature prediction algorithm which includes determining a goodness criterion. If the goodness criterion indicates that the prediction is not acceptably accurate then the steps of reading 82 the temperature sensors 18, 19, adjusting 82 heater power and calculating 86 predicted final temperature are repeated. If the goodness criterion indicates that the prediction is acceptably accurate then the temperature is displayed 90 in a human-readable form and a signal such as an audible signal or an LED is actuated 92 to indicate that the temperature indication is ready. The temperature prediction algorithm uses a least squared fitting routine described below that was empirically determined to optimally match the thermal characteristics of the temperature probe configuration of the invention.

The prediction algorithm implements a curve fit on the sensor data to match the linear form of the system equation given as equation 8 above. From the curve fit, the slope is extracted as the "a" term. The "a" term can then be used in equation 9 to get the final prediction temperature. Equation 9 is the temperature of the patient extrapolated to time equals infinity. In an exemplary embodiment, the complete prediction algorithm actually runs seven times, each time with a different value of Tp(0) found in equation 9. Each of the seven Tp(0) are separated in time so that each of the seven predictions are based on distinctly different data sets. Metrics are used to select the best prediction to report.

An exemplary embodiment of an electronic thermometer according to the invention activates automatically when the probe is withdrawn from the base unit. An audible indicator such as a beep notifies the user when the unit is ready to take a temperature as determined by preprogrammed steps in a control circuit. Alternative embodiments of the invention include a passive mode wherein the predictive steps are disabled, the heater is disabled and the thermometer is used like conventional thermometers, i.e., by waiting several minutes until the probe reaches equilibrium. Further alternative embodiments of the invention include memory space and circuits configured to store and retrieve measured temperature information.

Although embodiments of the invention have been described herein for use in the healthcare field, it will be appreciated that application of the present invention is not limited to the health care field. Embodiments of the invention may be used anywhere that fast response electronic thermometers are useful. For example, embodiments of the present invention may be used in industrial temperature measurement applications and various laboratory applications.

What is claimed is:

1. An electronic thermometer comprising:
   a probe tip separated from a probe shaft by a thermal isolator disposed therebetween; and
   a probe tip temperature sensor disposed proximate to said probe tip;
   a proximal temperature sensor thermally isolated from said probe tip;
   a heater element thermally isolated from said probe tip;
   a temperature prediction component electrically connected to said probe tip temperature sensor and said proximal temperature sensor and operative to calculate a predicted temperature using an optimized temperature prediction algorithm; and
   said temperature prediction algorithm including calculations based on a temperature of said heater element.

2. The electronic thermometer according to claim 1 further comprising a temperature control circuit providing controlled power to said heater element.

3. The electronic thermometer according to claim 2 wherein said temperature control circuit receives input from at least one temperature sensor and actively controls power to said heater element according to said input using an optimized heater control algorithm.

4. The electronic thermometer according to claim 1 wherein said heater element raise the temperature of said probe shaft that is thermally isolated from said tip and impedes heat flow from said probe tip to said probe shaft.

5. An electronic thermometer comprising:
   a probe shaft having a distal end and a proximate end;
   a separator mounted between said distal end and a thermal isolator;
   wherein said thermal isolator is disposed between and thermally isolates said separator and a probe tip;
   a heater element in thermal contact with said separator;
   a probe tip temperature sensor element in thermal contact with said probe tip; and a temperature prediction component which calculates a predicted equilibrium temperature according to signals from said probe tip temperature sensor acquired prior to said probe tip temperature sensor reaching thermal equilibrium with a measured subject and which calculates said predicted equilibrium temperature according to a least square fit algorithm.

6. The electronic thermometer according to claim 5 further comprising a proximal temperature sensor element in thermal contact with said thermal isolator.

7. The electronic thermometer according to claim 6 wherein said probe tip temperature sensor is mounted against said probe tip, and wherein said proximal temperature sensor is mounted against said thermal isolator.

8. The electronic thermometer according to claim 7 wherein at least one of said probe tip temperature sensor and said proximal temperature sensor is a thermistor.

9. The electronic thermometer according to claim 6 further comprising an active heater control circuit wherein said active heater control circuit causes said heater element to raise the temperature of said probe shaft in response to signals from said probe tip temperature sensor.

10. The electronic thermometer according to claim 9 wherein said active heater control circuit causes said heater element to raise the temperature of said shaft in response to signals from said proximal temperature sensor.

11. The electronic thermometer according to claim 10 wherein said active heater control circuit uses a substantially optimized algorithm programmed in a digital control device to cause substantially instantaneous changes in heater current in response to temperature sensor signals.

12. The electronic thermometer according to claim 11 wherein said substantially optimized algorithm is predetermined according to thermal characteristics of said probe for rapid tracking of probe tip temperature by probe shaft temperature.

13. The electronic thermometer according to claim 11 wherein said substantially optimized algorithm comprises the following equations:

Errorlast=Errornow;

Errornow=SP−Tptemp;

DutyCycle=(int)(Apreheat*Errornow+Bpreheat*(Errornow−Errorlast)+0.5);

wherein:
   Errorlast is a variable for storing the previously determined Errornow value;
   Errornow is a variable storing the difference between the point temperature and a measured probe tip temperature;
   DutyCycle is a variable representing the percentage of time to apply heater current;
   SP=35 C;
   Tptemp=probe tip temperature sensor data in degrees C.; and
   Apreheat and Bpreheat=constants that depend on power supply voltage level.

14. The electronic thermometer according to claim 5 wherein said temperature prediction component causes an output device to provide an indication of said predicted equilibrium temperature prior to said sensor reaching thermal equilibrium with said measured subject.

15. The electronic thermometer according to claim 5 wherein said temperature prediction component calculates said predicted equilibrium temperature according to the following equations:

$$T_b = T_p(R_1C_1 + R_2C_2 + R_1C_2 + (1-k)(R_3C_3 + R_2C_2 + R_1C_3)) +$$

$$\dot{T}_p(R_1C_1R_2C_2 + (1-k)(R_1C_1R_2C_3 + R_3C_3R_1C_1 + R_2C_2R_3C_3 + R_1C_2R_3C_3)) +$$

$$\ddot{T}_p R_1C_1R_2C_2R_3C_3(1-k).$$

which, when combined with the effects of our heater algorithm, can be modeled as:

$$T_p(t) - T_p(0) = \frac{t - t_0}{a \cdot (t - t_0) + b}$$

simplifying to linear form $$\frac{t - t_0}{T_p - T_p(0)} = a \cdot (t - t_0) + b$$

$$T_{final} = \frac{1}{a} + T_p(0).$$

16. The electronic thermometer according to claim 5 further comprising a thermal epoxy disposed between said probe tip and said separator.

17. The electronic thermometer according to claim 5 wherein said thermal isolator is made from HPDE-EXXON Escorene HD 6801YN or HPDE-Dow 25455N.

18. An electronic thermometer comprising:
   a probe tip separated from a probe shaft by a thermal isolator disposed therebetween;
   a probe tip temperature sensor disposed proximate to said probe tip; and
   a base component connected to said probe shaft by a cable;

wherein said base component houses control components for said heater element and temperature prediction components, said base component further including output devices in communication with said heater control components and said temperature prediction components.

19. A method of rapidly measuring the temperature of a subject comprising the steps of:
thermally insulating a thermometer probe tip including a temperature sensor from a thermometer probe shaft;
heating said thermometer probe shaft;
reading a temperature sensor signal from said temperature sensor;
predicting an equilibrium temperature according to a prediction algorithm which operates according to said temperature sensor signal;
reading a temperature sensor signal from said temperature sensor;
computing an optimal heater current control signal according to a heater control algorithm which operates according to said temperature signal; and
applying said heater current control signal to a heater current control component.

20. The method according to claim 19 wherein said heater current control algorithm comprises the steps of:
storing a previously determined temperature error value;
determining a temperature error value by subtracting said temperature sensor signal from a set point;
determining a duty cycle by:
multiplying said error value by a first preheat constant to obtain a first result;
multiplying a second preheat constant by the difference between said temperature error value and said a previously determined temperature error value to obtain a second result;
adding 0.5 to said first result plus said second result to obtain a third result;
and truncating a decimal portion of said third result;
wherein said first preheat constant and said second preheat constant depend on power supply voltage level.

21. The method according to claim 19 wherein said prediction algorithm comprises the steps of:
performing a curve fit to fit probe tip temperature data to a first equation:

$$\frac{t-t_0}{T_p - T_p(0)} = a \cdot (t - t_0) + b;$$

wherein $T_p$=probe tip temperature; and
applying the "a" term in said first equation to a second equation:

$$T_{final} = \frac{1}{a} + T_p(0);$$

wherein $T_{final}$ is the predicted final temperature.

22. The method according to claim 21 wherein said steps of performing a curve fit to fit probe tip temperature data to a first equation:

$$\frac{t-t_0}{T_p - T_p(0)} = a \cdot (t - t_0) + b;$$

wherein $T_p$=probe tip temperature; and
applying the "a" term in said first equation to a second equation:

$$T_{final} = \frac{1}{a} + T_p(0);$$

wherein $T_{final}$ is the predicted final temperature
are performed multiple times wherein each time said steps are performed a distinct value of $T_p(0)$ is used; and
selecting a best value of $T_{final}$.

23. The method according to claim 22 wherein said best value is selected by using metrics.

24. The method according to claim 22 wherein said multiple times equals seven times.

25. An electronic thermometer comprising:
a probe shaft having a distal end and a proximate end;
a separator mounted against said probe shaft;
an thermal isolator disposed over said distal end of said shaft;
a resistor capable of heating said separator connected to a heater control component;
a probe tip mounted to said thermal isolator at said distal end of said shaft and thermally isolated from said probe shaft, said separator and said heater element;
a first thermistor element mounted to said probe tip and connected to said heater control component and a temperature prediction component;
a second thermistor element mounted to said thermal isolator and connected to said heater control component and said temperature prediction component;
wherein said heater control component comprises an active heater control circuit that causes said resistor to raise the temperature of said separator in response to signals from said thermistors; and
wherein said temperature prediction component computes a predicted equilibrium temperature according to signals form said thermistors, said signals being acquired before thermistors reach equilibrium with a measured subject.

26. The electronic thermometer according to claim 25 wherein said temperature prediction component calculates said predicted equilibrium temperature according to the following equation:

$$T_b = T_p(R_1C_1 + R_2C_2 + R_1C_2 + (1-k)(R_3C_3$$
$$+ R_2C_2 + R_1C_3)) +$$
$$\dot{T}_p(R_1C_1R_2C_2 + (1-k)(R_1C_1R_2C_3 + R_3$$
$$C_3R_1C_1 + R_2C_2R_3C_3 + R_1C_2R_3C_3)) +$$
$$\ddot{T}_p R_1C_1R_2C_2R_3C_3(1-k).$$

which, when combined with the effects of a heater algorithm, can be modeled as:

$$T_p(t) - T_p(0) = \frac{t - t_0}{a \cdot (t - t_0) + b}$$

simplifying to linear form $$\frac{t - t_0}{T_p - T_p(0)} = a \cdot (t - t_0) + b$$

$$T_{final} = \frac{1}{a} + T_p(0).$$

* * * * *